Figure 1:
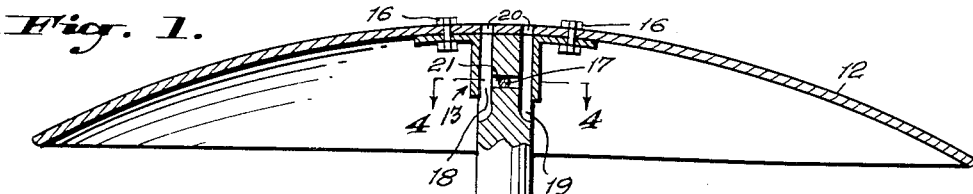

Oct. 18, 1955     S. S. DAVIS     2,720,862
PORTABLE TROUGH AND SHELTER
Filed Dec. 18, 1953

INVENTOR.
Samuel S. Davis

Henry C. Parker

By: Attorney.

United States Patent Office 2,720,862
Patented Oct. 18, 1955

2,720,862

PORTABLE TROUGH AND SHELTER

Samuel S. Davis, Fairmount, Ill.

Application December 18, 1953, Serial No. 399,045

9 Claims. (Cl. 119—61)

This invention relates to portable trough and shelter; and it comprises a shelter for cattle and the like having a heavy base in the form of a pedestal, a supporting column mounted in said base and a large roof-like top supported by said column at a height above the ground sufficient to permit cattle to pass beneath; said base being shaped and weighted in such manner that it is difficult to tilt and/or capable of righting itself when tilted and being provided with a peripheral ledge or feeding trough in which food or mineral supplements can be placed; and means providing ventilation for the shelter mounted at the top of the column; all as more fully hereinafter set forth and as claimed.

Cattle which are left to forage in a pasture during hot sunny weather will usually be found congregated around any shade trees which happen to be available. While they eat any grass which happens to be in the shade it frequently happens that grass in other sections of the pasture is neglected. There is no doubt that cattle during hot summer weather fare better and are more contented when shade is available to shield them from the sun but many pastures do not have suitable shade trees. It is also true that cattle during thunder storms invariably cluster for shelter around any trees that may be available. Too frequently these trees are struck by lightning in which case the cattle may be killed. The present invention provides a solution for these problems.

I have discovered that portable and inexpensive shelters can be constructed which are capable of protecting cattle from falling elements of weather, from sunlight and from lightning. I have found that shelters of the character of beach umbrellas are not suitable for this purpose since cattle are frightened by this type of structure and since a strong wind will blow them down. But cattle will actually seek out the shelters of the present invention owing to the fact that they can be made attractive to the cattle.

The structure of my new shelters is very simple. They consist merely of a pedestal-like base, an upright supporting column and a large-dome-shaped or dished top or shade mounted on top of the column. Ventilation should be provided at the top of the shade and, if desired, a spike can be provided in the base which when stuck into the ground helps to prevent the shelter from blowing over and at the same time provides an electrical ground for the shelter. Preferably the shelter is constructed of a light metal, such as aluminum or magnesium and the base should be shaped and weighted in such manner that the structure as a whole has a low center of gravity. The base is weighted in such fashion that the shelter rights itself automatically even when tipped over and the spike resists any force tending to tilt the structure. It is also important in making the shelters attractive to cattle to provide a feeding trough or ledge on the base which can be supplied with a slab of rock salt, for example, or with other cattle feed.

Figure 3:
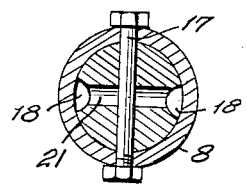
Figure 4:
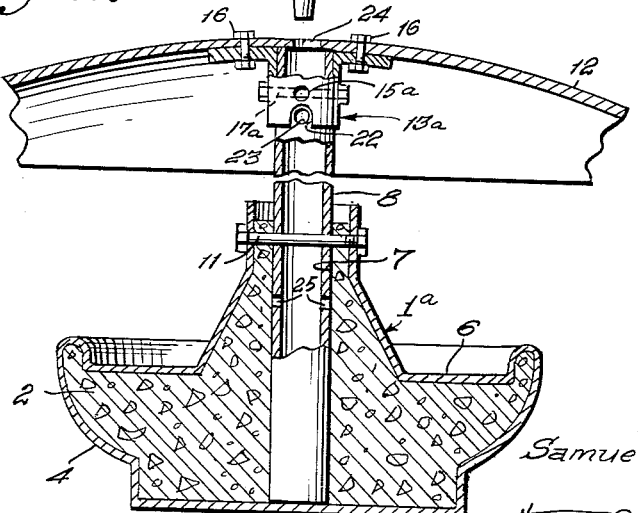

My invention can be described in greater detail by reference to the accompanying drawing which shows more or less diagrammatically two different modifications of my shelter. In this showing, Fig. 1 is a vertical section through the center of my shelter, Fig. 2 is a similar partial section of a modification with parts broken away to show details, Fig. 3 is an enlarged perspective view of the flanged sleeve connecting the supporting column to the top, while Fig. 4 is an enlarged horizontal section through the supporting column, taken along the line 4—4 of Fig. 1.

In the several figures like parts are designated by like reference numerals. My shelters are composed of three main parts, namely a base, shown generally at 1 or 1a, a supporting column 8 and a dome-shaped top or shade 12. Both modifications, shown in Figs. 1 and 2, employ a heavy base. This base may be of solid metal construction as shown in Fig. 1 or it can be hollow as in the case of the base of Fig. 2 and filled with a heavy material such as concrete, as shown at 2. When the base is solid it can be made somewhat smaller and it should be of a relatively heavy metal, such as cast iron, for example. Hollow bases can be made in two parts pressed or stamped from sheet metal, the parts being welded or otherwise secured together. Aluminum can be used in the construction of hollow bases, if desired. Both bases have a hemispherical section 4 at the bottom while at the top they have conical sections 5. The rounded bottom sections terminate upwardly in peripheral flanges which define the shelves 6. Both bases have a socket 7 to receive a supporting column 8. This column can be made solid, as shown in Fig. 1 or from a tube, as shown in Fig. 2.

The solid construction is conveniently used with a solid base and in this case the central socket in the base can pass all the way through the hemispherical section 4. Owing to the reduced size of this base it is convenient to provide a separate weighting element at the bottom in the form of a solid disc 9, shown in Fig. 1. This disc may be attached to the base and to the supporting column by means of a spike 3 which at its top 10 is threaded into the bottom of the column thus securing these three parts together. A bolt 11 can be provided at the top of the base to further secure the base to the column.

Figure 2:
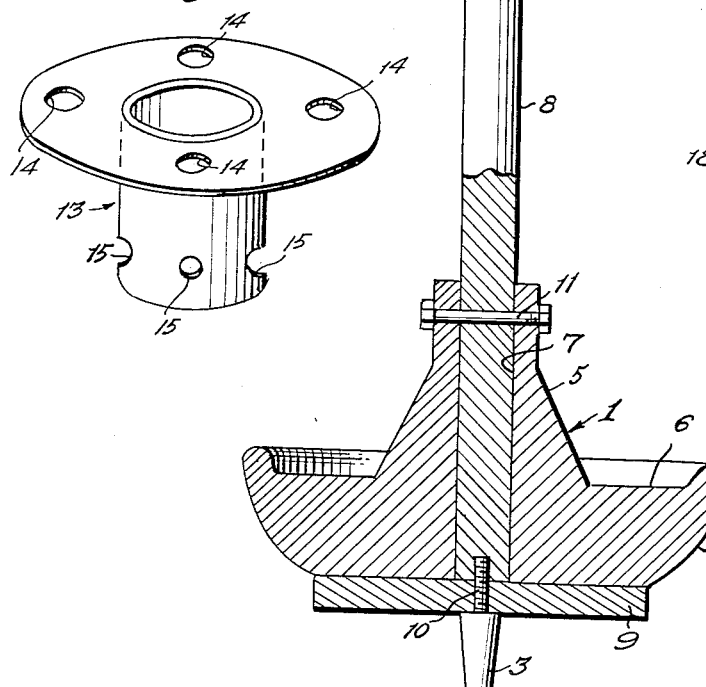

In the case of the hollow base and tubular column of Fig. 2 the most convenient way of securing the column to the base is to fill the base with concrete and to insert the column into the concrete while the latter is still plastic, letting the concrete harden around and inside the column. But a bolt 11 at the top of the base is also usually used in this construction.

The top or shade 12 can be secured to the top of the supporting column in various ways. One convenient way is to provide a flanged sleeve shown generally at 13; see Fig. 3. The flange of this element is provided with four bolt holes 14 while the sleeve is also provided with four bolt holes 15. The sleeve fits on the top of the column with a loose sliding fit. Bolts 16 pass through holes 14 and secure the flanged sleeve to the top while a single bolt 17 (Fig. 4) is used to secure the sleeve to the column.

Ventilation means are advantageously provided at the top of the shade. In the case of the embodiment shown in Fig. 1 a pair of vertical longitudinal slots 18 can be milled on opposite sides of the top of the column. These slots extend below the flanged sleeve and thus provide openings 19 for the air vents. Outlets for these vents are provided by the holes 20 in the top. These holes register with the slots 18 when the parts are in the positions shown in Figs. 1 and 4. The top of the supporting column is provided with a transverse bolt hole 21 which is positioned at right angles to that through which bolt 17 passes. This can be used to close the ventilating flues, this being accomplished by removing the bolt 17, rotating the top through an angle of 90° with respect to the base and then inserting the bolt through hole 21. The vent holes 20 in the shade will then be out of registry with the slots 18.

In the case of cylindrical supporting columns controlled ventilation can be provided as shown in Fig. 2. The flanged sleeve 13a is provided along its lower margin with two notches 22 which, when the parts are in the positions shown in Fig. 2, register with ventilating holes 23 in the column. A central hole 24 is provided in the top which, of course, registers with the air space in the column so that the upper part of the column forms part of the ventilating flue. The flanged sleeve 13a is provided with four horizontal bolt holes while the column may have only two. In order to close the ventilating holes 23 it is only necessary to remove bolt 17a, to rotate the shade through an angle of 90° with respect to the column and then to reinsert the bolt.

The top or shade 12 of these shelters may be made of various metals. Light metals, such as aluminum or magnesium are preferred since the top should be much lighter than the base to provide stability. The shade may also be made of various sizes, in fact it is advantageous to provide replaceable shades of at least two different diameters to suit the requirements of different customers. A shade having a diameter of from about 5 to 6 feet will afford a sufficient shield from the sun for a single cow while providing shelter for two cows during a thunder storm, while an 8 foot shade will shield at least two cows from the sun and provide shelter for three during a storm. The shades should be dished to only a small extent so they will not catch the wind unduly. For a 6 foot shade the vertical distance from the center to the periphery should not substantially exceed about 1 foot, for example. The height of the shade above the ground should be sufficient to provide ready access for the animals to be sheltered. This height can be made adjustable by providing a series of bolt holes 25 in the supporting column to receive bolt 11, as shown in Fig. 2. In this case, of course, the supporting column 8 must be free to slide in its concrete setting 2.

In practice several of my shelters should be spotted around at different points in a pasture. As soon as the cattle have become accustomed to these shelters, which does not take long if they are provided with food, the cattle will seek them out and make good use of them both for shelter and shade. For protection against lightning it is necessary, of course, that the shelters be well grounded. Owing to the substantial weight of the bases and the fact that moisture tends to collect beneath the bases there is usually no difficulty in establishing good electrical contact between the bases and the ground. In any case this contact will be better than that from the cattle to the ground and therefore lightning will be grounded without harm to any cattle clustered beneath the shelters. The spike 3 furnishes a good ground for the shelters and hence I usually provide this in both types. The shelters can be rolled along on their hemispherical bases and quickly moved from one point to another in the pasture in spite of their weight which may vary from a minimum of about 75 pounds to 200 or more pounds, depending upon their size and the construction materials used.

While I have described what I consider to be the more advantageous embodiments of my shelter it is evident, of course, that various modifications can be made in the specific structures which have been described without departing from the purview of this invention. The tops or shades, for example, can be made of different shapes as well as of different sizes. Ventilating holes can be provided wherever needed in the tops. The bases can be made of various shapes and sizes and various conventional means can be employed for securing the supporting columns to the bases and the tops to the supporting columns. Various construction materials can be used. For example, the tops or shades can be made of plastic, if desired. Even reinforced concrete can be used. The base can also be made of concrete if desired although, for protection against lightning, a metal conductor leading from the supporting column to the ground should be provided. For use in a pasture the shelters can be painted a green or tan color.

It is evident, of course, that my shelters are just as useful for humans as for animals. They can be set up on picnic grounds, for example, to provide shade and protection against storms. My shelters are particularly valuable at stops for buses, trolleys and trains, for example, where the patronage would not justify the building of more expensive shelters. It is thus evident that my invention provides an inexpensive and practical shelter for man and beast. Other modifications of my shelter which fall within the scope of the following claims will be immediately evident to those skilled in this art.

What I claim is:

1. A portable shelter which comprises a heavy base adapted to rest on top of the ground having a central vertical socket and a rounded bottom section with its weight so disposed that the shelter tends to right itself, said rounded bottom section terminating upwardly in a peripheral flange which defines a shelf forming a feeding trough, an upright supporting column mounted in said socket and a light-weight roof-like top secured to and supported by said column.

2. The portable shelter of claim 1 wherein a removable spike is provided at the bottom of said base adapted to be thrust into the ground to help prevent the shelter from being tipped over.

3. The shelter of claim 1 wherein the base is of solid metal having a socket to hold said supporting column.

4. The shelter of claim 1 wherein the base is a metal shell filled with concrete.

5. The shelter of claim 1 wherein the supporting column is a solid metal cylinder which at its top is provided with vertical longitudinal ventilating slots and a flanged sleeve, the flange of the sleeve being secured to the top, the sleeve covering the upper portion only of said vertical slots and wherein holes are provided in said top which register with said vertical slots thereby providing ventilating flues for said roof-like top.

6. The shelter of claim 5 wherein means are provided to secure the said sleeve to said supporting column which are adjustable so that in one position said slots register with the holes in said top while in another position the holes are out of registry thus closing the ventilating flues.

7. The shelter of claim 1 wherein the supporting column is tubular and provided with holes close to its upper end, wherein said roof-like top is secured to said column by means of a flanged sleeve, the flange of said sleeve being secured to said top, the column being rotatable in said sleeve, said sleeve being provided with notches at its lower edge adapted to register with the holes in the column when the top is in one position with respect to said column, said holes being out of registry when the top is in a second position with respect to said column, and a hole is provided in said top communicating with the interior of said column and thus providing, with said column and the holes in said column, an adjustable ventilating flue for said top, and means for selectively securing said top in each of said positions with respect to said column.

8. A portable shelter which comprises in combination a heavy annular base having a flat circular bottom on which the shelter rests on top of the ground when in its upright position, the base flaring outwardly from the said bottom and being rounded and sufficiently heavy so that when tilted the shelter tends to right itself, an upright supporting column mounted centrally on top of said base, a relatively light roof-like top secured to and supported by said column, and a spike in the center of the bottom of the base adapted to be stuck into the ground to resist the tilting of the shelter and to provide an electrical ground for the shelter.

9. A portable shelter which comprises in combination a heavy annular base having a flat circular bottom on which the shelter rests on top of the ground when in its upright position, the base flaring outwardly from the said bottom and being rounded and sufficiently heavy so that when tilted the shelter tends to right itself, an upright supporting column mounted centrally on top of said base, an annular shelf serving as a feeding trough formed in the top of the base around said upright column, a relatively light roof-like top secured to and supported by said column, and a spike in the center of the bottom of the base adapted to be stuck into the ground to resist the tilting of the shelter and to provide an electrical ground for the shelter.

References Cited in the file of this patent

UNITED STATES PATENTS

| | | |
|---|---|---|
| 284,846 | Herron | Sept. 11, 1883 |
| 1,228,615 | Stafford | June 5, 1917 |
| 1,370,697 | Mann | Mar. 8, 1921 |
| 2,571,536 | Bush | Oct. 16, 1951 |
| 2,577,317 | Eschrich | Dec. 4, 1951 |
| 2,625,130 | Morser | Jan. 13, 1953 |

FOREIGN PATENTS

| | | |
|---|---|---|
| 125,078 | Australia | Aug. 1, 1947 |